INVENTOR.
BERNARD SPIEKER
BY
Constantine A. Michalos
ATTORNEY

May 9, 1967 B. SPIEKER 3,319,095

ELECTRIC MOTOR

Filed March 17, 1964 2 Sheets-Sheet 2

INVENTOR.
BERNARD SPIEKER
BY
Constantine A. Michalos
ATTORNEY 3,319,095
Patented May 9, 1967

3,319,095

ELECTRIC MOTOR

Bernard Spieker, New Milford, N.J., assignor to The Bendix Corporation, Teterboro, N.J., a corporation of Delaware Filed Mar. 17, 1964, Ser. No. 352,479
5 Claims. (Cl. 310—68)

This invention relates to electric motors used in precision optical memory systems, and particularly to a novel means for controlling the distance and alignment relationship between bearings supporting an electric motor shaft, and between the bearings and the frame structure of the motor housing, to thereby provide an efficient motor assembly having maximum rigidity with minimum shaft run-out and which is utilized in controlling the alignment accurary of an optical coded information drum of a high density, large capacity, permanent optical storage memory unit of an aerospace digital computing control system.

Heretofore, it has been the practice to provide bearing bores within removable bearing supports such as the end bells of a motor housing for supporting the electric motor shaft bearings. Since the end bells or other means of supporting the shaft bearings were removable and interchangeable, dimensions had to be closely held to preserve alignment of the bearings and consequently, to preserve alignment of the shaft and thereby prevent shaft run-out. Since the bearing supports or end bells supporting the bearings were removable from the frame, there was no rigid structure and therefore accurate relocation of the bearings within the frame, to provide rotation of the shaft at the exact center line of the electric motor, could not be assured. It necessitated the use of dowel pins to properly align the members which did or did not securely maintain the motor shaft in aligned position.

In magnetic memory systems for digital computer bulk memory systems utilizing drums or cores or punched tapes, the use of conventional type electric motors was not of great disadvantage. In optical memory systems for aerospace needs as provided in a copending U.S. application Ser. No. 336,487, filed Jan. 8, 1964, by Walter W. Lee et al. and assigned to The Bendix Corporation, the same assignee as the present invention, there is needed a coded information drum having an exceptionally large system storage capacity not anticipated by the present memory storage systems. A new electric motor having a highly accurate motor shaft alignment was required. As the program increased, with much complexity, the conventional electric motor could not handle the accuracy needed for high storage optical memory devices.

The substitution of optical techniques for magnetic techniques, in the design of storage memory systems, wherein the illuminated bit of information is magnified by lenses to several times its size, involves accurate alignment between the coded information drum and the lens reading out the bits of information from the drum. That is, the bits of information are formed or inscribed as microimages in horizontal tracks on the circumferential surface of the drum. Each bit of information being .010″ long and .0015″ wide. The information is read by read-heads mounted radially adjacent the circumference of the drum. The read-heads have extremely small individual lenses mounted very close to the tracks for pick-up of the information upon rotation of the drum. Any misalignment of the drum, which is supported by the electric motor, would present a large error in reading the bits of information.

Therefore, the solution of the problem lies in providing, as disclosed by this invention, an electric motor having a one-piece rigid housing that can be accurately machined to provide the close tolerance needed in bearing bores and consequently for high accuracy in motor shaft alignment.

It is therefore a primary object of this invention to provide, in an electric motor, the means for controlling the distance and alignment between the bearings supporting the electric motor shaft, between the bearings and the motor, and between the frame structure of the electric motor and an optical memory coded information drum.

Another object of this invention is to provide an electric motor having a rigid, one-piece housing that can be economically and accurately machined to provide close tolerance in bearing bores for supporting bearings, and, in turn, for supporting the motor shaft for accurate alignment of the motor components upon assembling and reassembling of the electric motor.

Another object of this invention is to provide a technique for minimum shaft run-out within an electric motor by utilizing a housing having the end bells integral to the frame of the electric motor.

Another object of this invention is to provide an electric motor having a high shaft alignment accuracy while providing minimum cost of precision machining.

A further object of this invention is to provide a process of making an electric motor frame requiring only two passes of a broaching machine, and one turning operation, thereby utilizing the lowest cost of precision machining obtainable.

An additional object of this invention is to provide a simple electric motor having a minimum number of parts that is so constructed that it can be easily and completely disassembled and assembled without affecting the relative location of the two bearings supporting the motor shaft.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
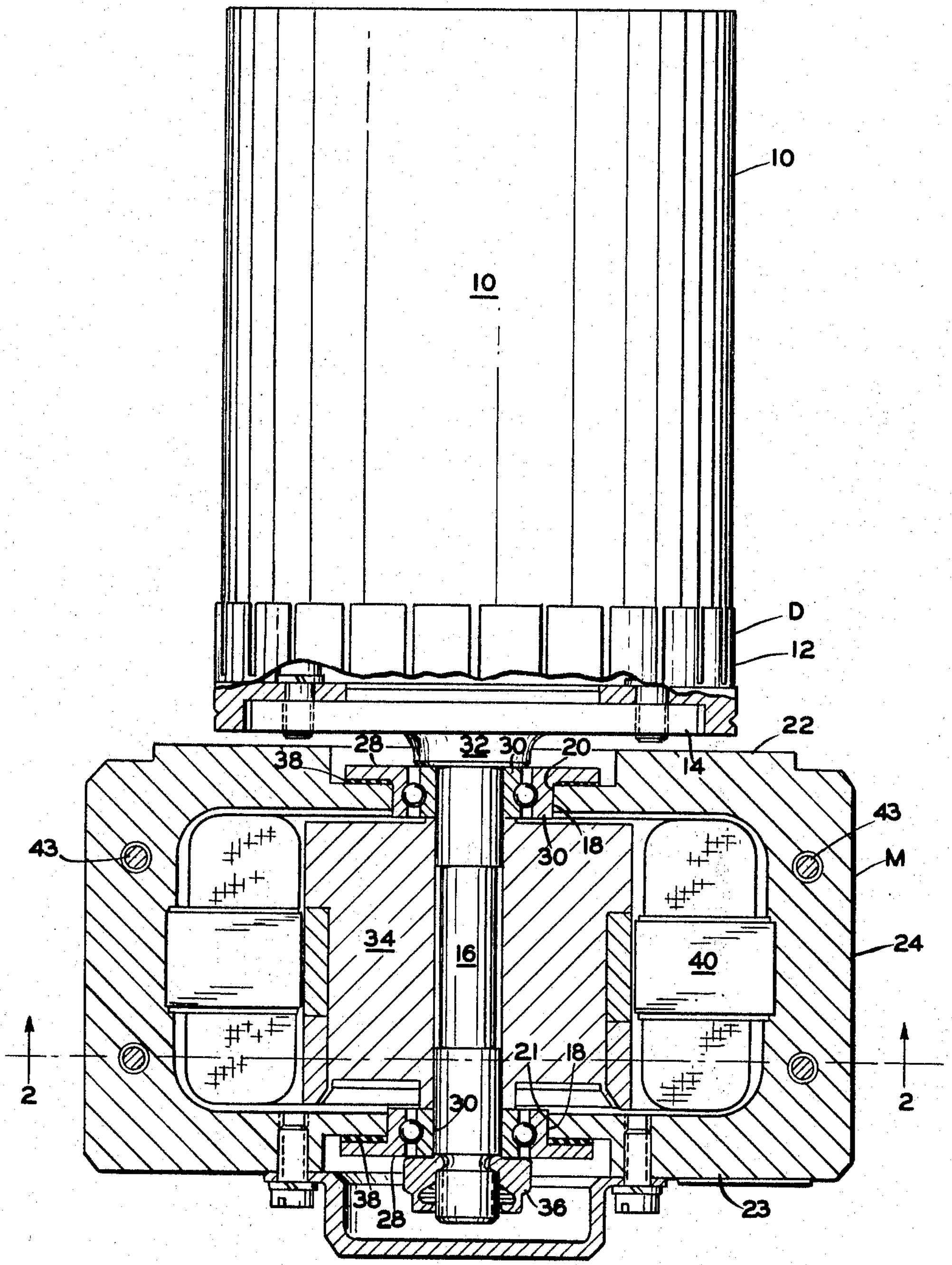
FIGURE 1 is a side elevation partly in section showing an assembled electric motor with the one-piece housing having the end bells integral to the frame in accordance with a preferred embodiment of this invention.

Referring to the drawing, a motor assembly M is shown mounting a drum assembly D. The drum assembly D has a glass drum 10 approximately 2½ inches long by 2 inches in diameter. The glass drum 10 is a highly precise optical glass cylinder having on its surface a photographic emulsion on which is inscribed microphotographically an information pattern, as more fully shown in the copending U.S. application Ser. No. 336,487.

As shown in FIGURE 1, the glass drum assembly comprises the optical glass cylinder or drum 10 which is permanently mounted on a metal hub 12 as more fully disclosed in a copending U.S. application Ser. No. 362,891, filed Apr. 27, 1964, by Spieker and assigned to The Bendix Corporation, the same assignee as the present invention. A micro-photographic pattern is then etched onto the presensitized surface of the glass drum 10 as more fully described in a copending U.S. application Ser. No. 363,085, filed Apr. 28, 1964, by Lee et al. and assigned to The Bendix Corporation, the same assignee as the present invention. The assembled drum may be mounted in a read-out device (not shown) including an illuminating means supported internally of the glass drum and read-out sensors externally of the drum as more fully described in a copending U.S. application Ser. No. 336,487.

The illuminated pattern on the drum can be given a large magnification in an extremely short distance, by the lens of a read-head (not shown). The drum is then rotated between the inside light source (not shown) and the outside read-heads (not shown) by means of the motor assembly M.

In order to preserve the accuracy between the drum assembly D and the motor assembly M, the drum 10 is very accurately mechanically linked by the hub 12 and motor shaft 16 to the motor assembly M. To obtain accurate rotation, a hysteresis synchronous motor is used which allows for a constant speed without the use of slip-rings or brushes. By using a one-piece motor housing, mounting procedure is so accurate that a total run-out of the drum 10 is less than .0002 inch. The motor shaft 16 with the drum 10 is held by a pair of matched preloaded ball bearings 18, one at each end of the shaft 16.

To provide for the mechanical rigidity demanded by the optical system herein mentioned, the bearings 18 are contained within bearing bores 20 and 21 of an upper disc or end bell 22 and a lower disc or end bell 23 of a one-piece motor housing 24.

Figure 3:
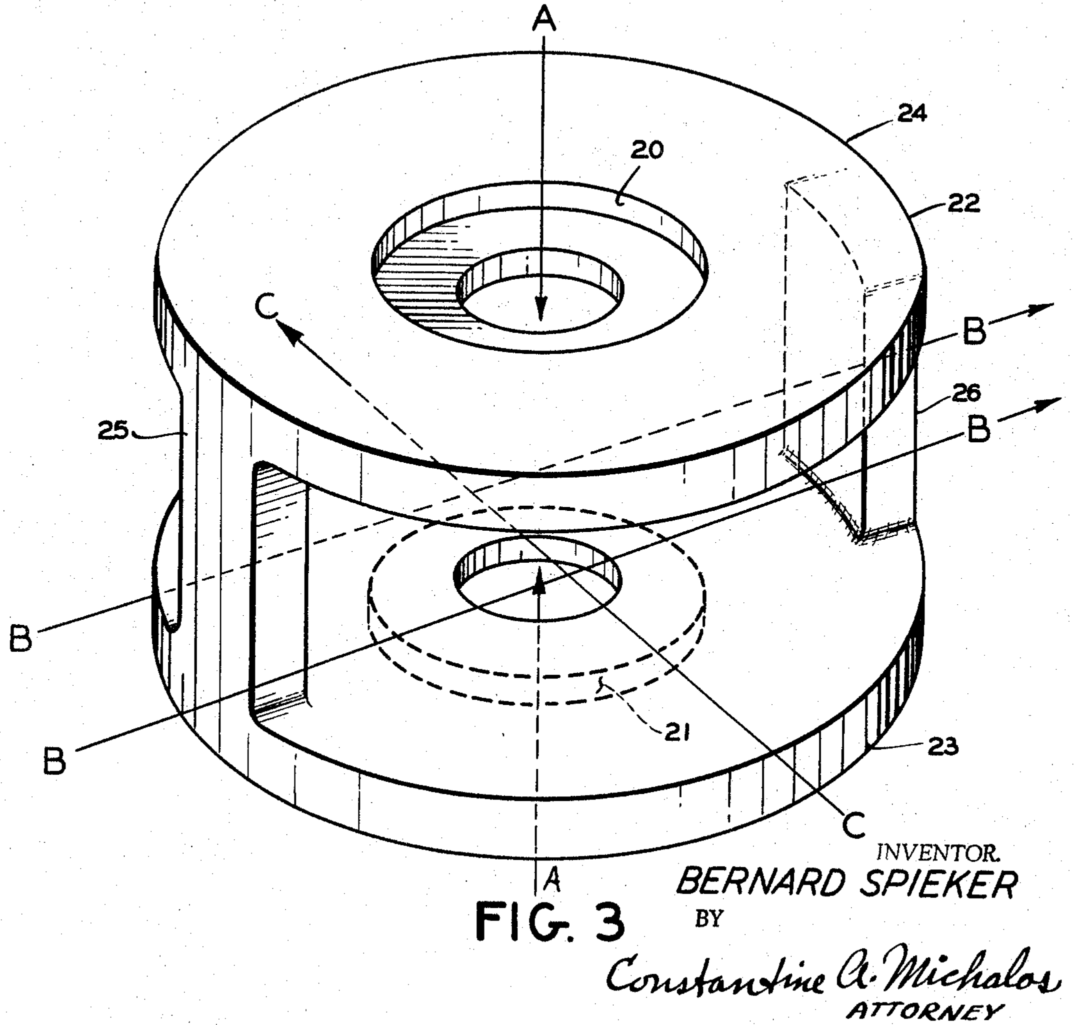
FIGURE 3 is a perspective view of the motor frame as shown in FIGURE 1.

Referring more specifically to FIGURE 3, it can be seen that the upper and lower discs 22 and 23, which contain the bearing bores 20 and 21, are integral with two supporting posts 25 and 26 for maintaining accurate relationship of the two discs 22 and 23 to each other. It should be noted that the whole housing is made from one piece of metal. The rigid one-piece housing 24 can be finished from a rough casting by one turning operation and two passes through a broaching machine. These machining operations are the lowest cost for precision machining possible. That is, as shown in FIGURE 3, the one turning operation can be made as shown by arrows A—A to machine the two end bores 20 and 21 for the bearings 18, and the two broaching operations can be made as shown by arrows B—B and C—C to machine openings on the sides of the housing, leaving the two supporting posts 25 and 26.

This arrangement is of particular advantage as the bores in which the bearings are secured may be accurately formed in both ends of the housing by the use of one pass drilling through the single frame structure from one end in one operation, thus assuming the greatest degree of accuracy in the assembly of the bearings and motor shaft. By providing the single frame concept, it is possible to eliminate several machining operations on the motor frame and still accurately align the motor shaft within the frame. This reduction in machining operations provides for both extremely accurate and economical electric motor housing.

The bearings within bores 20 and 21 are firmly attached by screws (not shown) through outer flanges 28 to discs 22 and 23. Inner races 30 of the bearings 18 are firmly gripped between a motor shaft shoulder 32, a rotor 34, and a retaining nut 36. Adjustment of end play in the shaft is made by adding shims 38 as required at each end of the housing.

Figure 2:
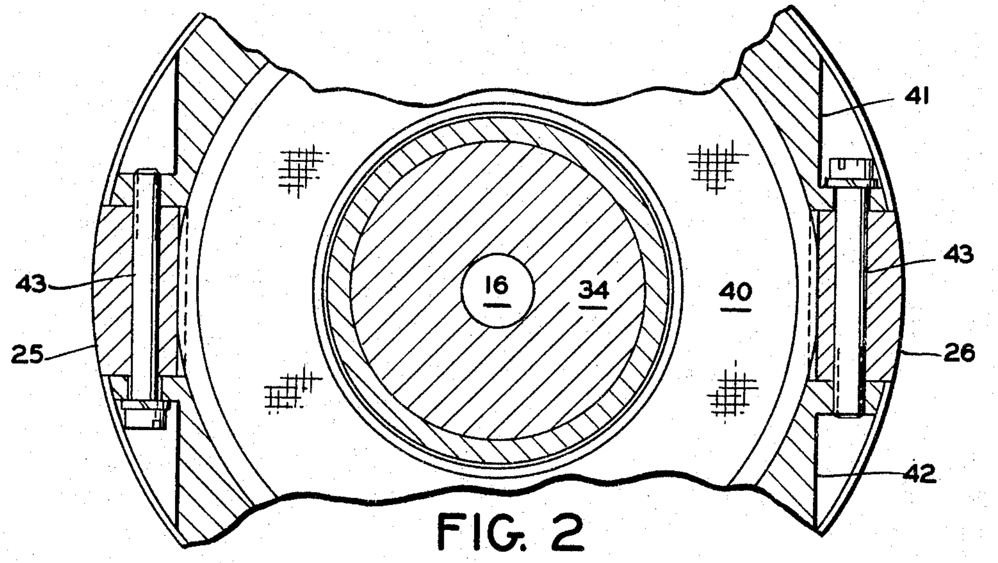
FIGURE 2 is a section taken along line 2—2 of FIGURE 1.

The motor is assembled by inserting rotor 34 within a stator 40 and the assembled rotor and stator are inserted into the housing between upper and lower discs 22 and 23 from the side in the direction of C—C as shown in FIGURE 3. The assembled rotor 34 and stator 40 are then centered and retained by two curved clamps 41 and 42 held by screws 43 on the posts 25 and 26 as shown in FIGURE 2. Bearings 18 are inserted in bearing bores 20 and 21 and the shaft 16 is axially inserted through bearing 18 in bore 20, through rotor 36 and through bearing 18 in bore 21. Retainer nut 36 is screwed on to shaft 16.

As the locating surfaces of the bearings are in the same piece of metal and machined in the same operation, their relative location can be held much more accurately than in the conventional type of housing. This in turn allows the center of rotation of the shaft to be much more closely controlled.

Although but a single embodiment of the invention has been illustrated and described in detail, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An electric motor for providing precise movement of rotating elements, comprising a stator, a rotor positioned within the stator, a unitary housing formed from a single piece of material and having a pair of end bells axially spaced from one another by supporting posts and providing openings between the posts for insertion of the stator and rotor therethrough to a position in which the stator and rotor are aligned axially of the housing, clamping elements attached to said housing and securing said stator within said housing, said end bells having axially aligned bearing bores therein, bearings mounted in said bores, and a shaft adapted to be axially inserted through one of the bearings, through the rotor, and through the other bearing and mounting the rotor for rotation within the stator, means for securing the bearings and rotor to the shaft, and means within the bores for spacing the bearings to correspond with the spacing of the end bells to avoid end play of the rotor relative to the stator.

2. An electric motor comprising a shaft, a one-piece rigid housing having a pair of end bells axially spaced from one another by supporting posts, a bearing bore in each end bell, bearings having outer flanges and mounted within said bearing bores and supporting said shaft, shims between said bearing flanges and end bells for preventing end play of the shaft, a rotor mounted on said shaft, a stator in said housing surrounding said rotor, and means for securing said rotor and bearings to said shaft.

3. In an electric motor for use with a read-out device requiring minimum axial and radial displacement, a stator, a rotor within said stator, a unitary housing having circular end bells spaced by a pair of supporting posts providing a pair of openings therebetween, said end bells having axial bearing bores of smaller diameter than the rotor the rotor being adapted to be inserted with the stator within said frame through one of said openings, bearings mounted in the bearing bores, a shaft rotatably supported by said bearings and mounting the rotor for rotation relative to the stator, and a pair of clamps secured to said housing for rigidly holding the stator within the housing.

4. In an electric motor having a rotor and a stator, a one-piece housing including a pair of opposed discs having axial bearing bores of smaller diameter than the rotor for supporting therein a pair of bearings and means for spacing said discs in parallel relation, said housing having openings between the spacing means for inserting the rotor and stator when assembling the motor.

5. In an electric motor having a stator and a rotor mounted on a shaft for rotation in bearings relative to the stator, a one-piece motor housing having a pair of end bells with bearing bores of smaller diameter than the rotor for receiving the bearings, and a pair of supporting posts integral with said end bells for spacing said end bells in parallel relation and forming with the end bells opposed openings for inserting the rotor and stator therethrough when assembling the motor.

References Cited by the Examiner

UNITED STATES PATENTS

| | | | |
|---|---|---|---|
| 2,935,785 | 5/1960 | Stein | 310—258 |
| 3,062,975 | 11/1962 | Starre | 310—258 |

(Other references on following page)

| | | | |
|---|---|---|---|
| 3,228,009 | 1/1966 | Wolf | 340—173 |
| 3,229,047 | 1/1966 | Simpson | 340—173 |

References Cited by the Applicant

UNITED STATES PATENTS

| | | |
|---|---|---|
| 1,540,038 | 6/1925 | Spielman. |
| 2,274,351 | 2/1942 | Wood. |
| 2,277,264 | 3/1942 | Youhouse. |
| 2,411,684 | 11/1946 | Hamilton et al. |

| | | |
|---|---|---|
| 2,613,242 | 10/1952 | Shumaker et al. |
| 2,693,542 | 11/1954 | Vance. |
| 2,716,709 | 8/1955 | Rowe. |
| 2,798,901 | 7/1957 | Harter. |
| 2,965,774 | 12/1960 | Rangus. |
| 3,035,192 | 5/1962 | Schaefer. |

MILTON O. HIRSHFIELD, *Primary Examiner.*

J. D. MILLER, *Assistant Examiner.*